Dec. 19, 1967   K. CLAUS ET AL   3,359,100
PRODUCTION OF WELDING STEEL
Filed Oct. 11, 1965   4 Sheets-Sheet 1

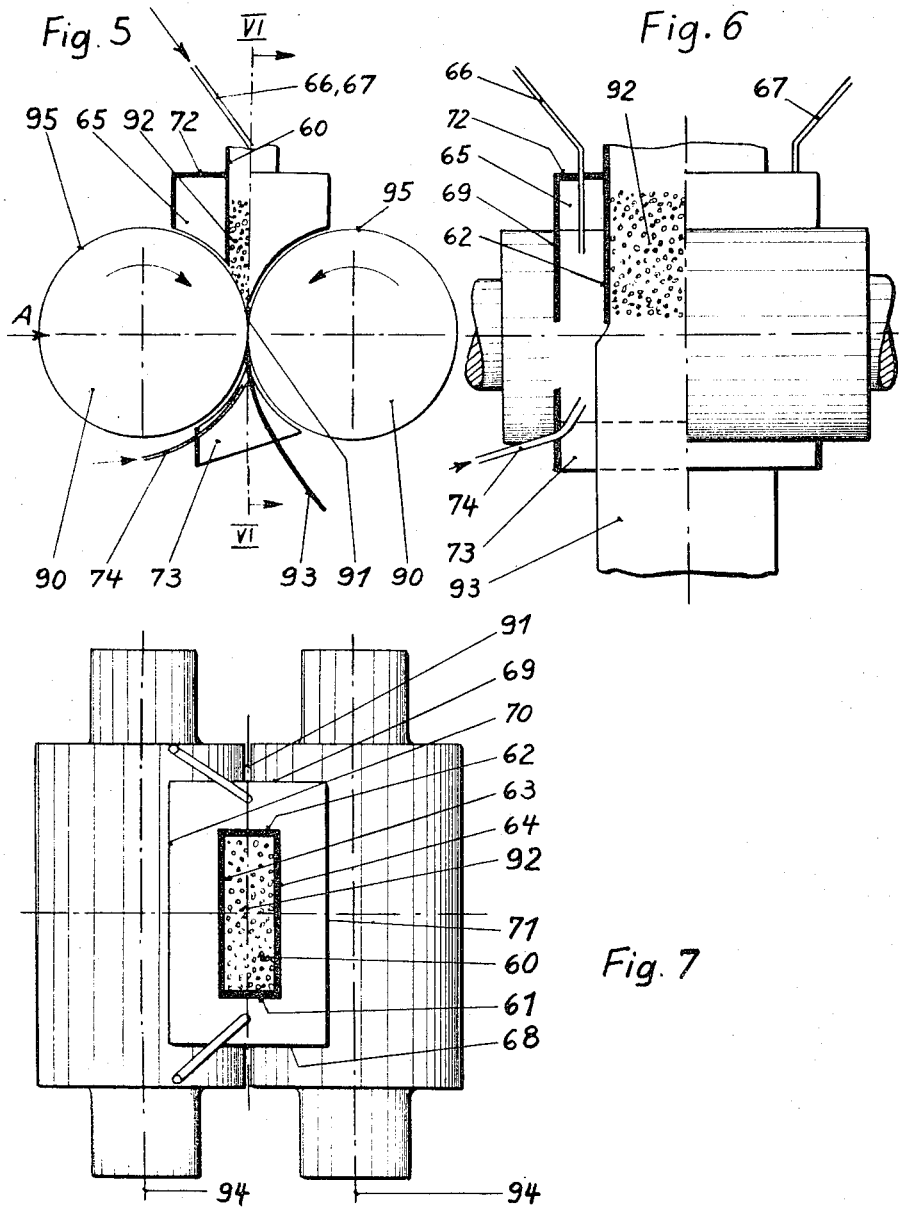

United States Patent Office 3,359,100
Patented Dec. 19, 1967

3,359,100
PRODUCTION OF WELDING STEEL
Kurt Claus, Metzkausen, Eckard Gehring, Dusseldorf, Kaiserswerth, Ulf Geier, Osterath-Bovert, Werner Marx, Dusseldorf, and Oswald Kaiser, Lintorf, near Dusseldorf, Germany, assignors to Schloemann Aktiengesellschaft, Dusseldorf, Germany, a German company
Filed Oct. 11, 1965, Ser. No. 494,839
Claims priority, application Germany, Oct. 22, 1964, Sch 35,997; Jan. 19, 1965, Sch 36,408, Sch 36,409; Mar. 17, 1965, Sch 36,719; Apr. 14, 1965, Sch 36,882; Apr. 17, 1965, Sch 36,901
18 Claims. (Cl. 75—214)

This invention relates to a method for the production of weld steel. This was formerly produced from blooms made by the puddling process, or from ingot-steel or weld-steel scrap piled into fagots. It is characteristic of both methods that oxides of iron present were converted into liquid slags, and were squeezed out during deformation, such as forging, extrusion or rolling. For this, very high degrees of deformation were required. Nevertheless the slag inclusions could not always be removed to a sufficient extent, so that a heterogeneous texture resulted, and the products no longer fulfilled present-day requirements. In addition, to this the method was associated with severe manual labour, which, notwithstanding experimental research, could not be replaced by machines.

This invention starts from the weld-steel method described, and consists in the feature that the oxides of iron on the surface of the parts to be welded are converted into iron by reduction, preferably with reducing gases. An advantage of this method, when adopting reducing gases containing hydrogen, is that in this way it is possible to eliminate the oxides completely, since the water vapour that forms during the reduction can be drawn off without any trouble.

Another advance over the weld-steel method hitherto used is that the oxides of iron or the products resulting therefrom are removed before the welding. It is thus possible to eliminate them completely without their having to be squeezed out by great deformation. A consequence of this is that the welding is not hindered in any way. Hence a comparatively small degree of deformation is sufficient to produce the known advantageous properties of weld steel completely. It has been found that a single roll pass is already enough for obtaining complete welding, and therefore a work-piece of satisfactory properties, whereas with merchant bar or fagoted steel a number of roll passes, with intermediate re-heating, were required.

A further step in the improvement of the old weld-steel method consists in welding to one another substantially smaller portions or particles. No dimension of the particles employed is to be greater than eight times the thickness of the strip material to be produced. The particles employed are to be preferably of similar size and of similar shape to one another, for instance substantially spherical or ellipsoidal. The particles may be cast (granules), deformed (shavings) or porous (iron sponge). When employing granules of spherical or like form, those are particularly preferable which have a diameter of not more than four times the thickness of the material of the strip product to be produced.

The special production of such particles seems expensive as compared with the use, formerly customary, of scrap or blooms; but the advantages of using comparatively small particles, as compared to scrap or blooms, are so considerable, particularly when they are of similar shape and of small size, that the production of such particles for carrying out the weld-steel method is economically profitable. Particles produced by granulating liquid steel by means of water under pressure have proved especially economical, and very suitable technically. Preferably a jet of cast steel is split up by means of a jet of water, this method is cheap; and the superficial oxidation thus arising is reversed during the subsequent deoxidation.

The advantage of employing such particles which are small compared to blooms resides in the fact that the work of deformation required for obtaining a satisfactory texture is not greater than is necessary. If the deformation is effected by rolling, the particles to be rolled, provided they are of the dimensions mentioned, lie reliably within the gripping angle of the rolls.

It is not absolutely essential, with the welding method, to adopt a particularly high temperature, since no slags are present which must be fusible. To diminish the work of deformation, however, the particles, before being welded, are if possible to be heated up to at least 600° C., but in any case not to a temperature above the melting point of the steel. As soon as and for as long as the particles are heated up to at least 500° C., they are to be moved relatively to one another to prevent them sintering together. Such relative movements may for instance be obtained in a rotary cylindrical kiln or oven, or by introducing a strong current of hot gas into the supply path of the individual particles to the place of treatment. The method according to the invention presents special advantages when welding the particles in a rolling mill, because here a completely continuous method of working can be obtained. The method can however be carried out in pressing and drop-forging die or swages.

In passing through the roll gap there takes place not only an uninterrupted compression of the particles but also a welding of the particles together. The gases present in the interstices between the particles escape, predominantly in a direction opposite to the direction of rolling. When rolling metal powder a high speed is not admissible, for at high peripheral speeds of the rolls such a strong current of gas or air arises that particles of the powder to be welded are carried away by it, thus leading to disturbances in the supply of material.

Now it has been found that particles the maximum dimension of which amounts to at least 0.2 mm., for instance granulate or iron sponge, can be successfully rolled at a peripheral roll speed of more than 0.4 metre per second.

Iron granulate the maximum particle dimension of which preferably amounts to more than 0.5 mm. is indeed successfully rolled with a roll-periphery speed of from 1 to 1.5 metres per second, so that the production of weld steel becomes extremely economical. Steel granulate and iron sponge the smallest particles of which have been sifted through a screen of 2 mm. width of mesh have been rolled at a peripheral speed of the rolls of from 1 to 1.5 metres per second. Observations made during the rolling showed that not the slightest disturbance occurred in the feeding of the material. It is therefore to be expected that the method will admit of being carried out even at substantially higher peripheral roll speeds.

The use of comparatively small particles enables these portions to be welded in a single pair of rolls and in a single pass through the rolls. By this means the dimensions and the cost of apparatus for the production of strips and sections for example by the welding process are greatly reduced.

The material produced in the welding process according to this invention is not merely equal to ingot steel, but also, for certain cases, presents special advantages. On account of the irregular orientation of the particles used, this is particularly applicable to the production of transformer laminations, and of metal sheets for deep drawing.

The carrying out of the method with the aid of a rolling mill will be described hereunder by way of example. The initial material may consist predominantly of ball-like granules of an average diameter of 2 mm.

The contaminations on the surfaces of such particles are primarily ferric oxide. These contaminations are removed by any de-scaling method. In the present connection bright annealing has proved particularly advantageous, because it admits of being combined with the heating of the particles up to welding temperature. This method of deoxidation presents the special advantage that the heating can be effected in a reducing atmosphere, which precludes any oxidation. The bright annealing may be effected at above 600° C. when heating up to a working temperature of from 900° to 1250° C. As a modification of this, the commencement of the heating may even be effected in an oxidising atmosphere, provided a sufficient deoxidation is then effected in a reducing atmosphere.

It is particularly advantageous to carry out the deoxidation and the heating in a rotary cylindrical kiln, since owing to the incessant movements to which the particles are subjected in a cylindrical rotary kiln, any premature caking together is obviated. This operation may be carried out in a rotary cylindrical kiln, electrically heated, directly or indirectly, or indirectly heated by gas, with a reducing gas, for instance hydrogen, as the reducing agent. The heating could however, be more economically effected in a directly gas-heated rotary cylindrical kiln, the deoxidation being obtained by suitable flame-regulation. By the bright annealing, the oxidised surfaces of the particles are reduced, which is particularly important, because these oxides, at the welding temperature, may be more readily deformable than the steel particles, and consequently, upon welding occurring between two adjacent particles, whole-area separating surfaces would always be formed, which, during welding, as in the old weld-iron process, could only be pressed out of the material by very strong deformation.

When the particle surfaces have been freed from oxides it is also necessary to supply the particles from the reducing kiln to the rolling mill in such a manner as to preclude reoxidation or contamination. For this purpose the kiln outlet is arranged over the roll gap of a horizontal roll stand, the two roll axes of which are located about in a substantially horizontal plane. The shortness of the time required for passing between the kiln outlet and the roll gap not only enables the oxidation to be kept small, but also guards against losses of heat. The path between the kiln outlet and the roll gap may furthermore be screened from the exterior by a protective casing, whereby losses of heat and access of air are largely prevented. Protective gas is supplied from the heating kiln within the protective casing to the roll gap at a pressure slightly above atmospheric.

As a particularly cheap reducing medium, partially burnt town gas or partially burnt natural gas has been found useful. This partially burnt town gas or natural gas may be used for reduction either immediately after the burning, or only after being dried. In the former case the heat of combustion may advantageously be utilised directly for heating up the parts to be welded. Furthermore, it is also possible to use solid reducing agents. In the last-mentioned case one may work with inert gases as means for protection against oxidation, for instance with nitrogen or argon, in which case the heating may be effected indirectly, either electrically or by burning gas.

It has been found that it is not necessary to work under reducing conditions throughout the whole of the heating operation. It is sufficient that reducing conditions should prevail at least in the region of the kiln outlet, and that the particles to be welded should remain for a sufficient length of time in the reducing zone, or that the time of passage should be sufficiently long, to free the surfaces to an adequate extent from disturbing oxides.

The testing of steel strips that have been produced according to the invention has shown that the welds are by no means weak spots in a finished strip. For example, a strip about 2 mm. thick was tested. When tested to destruction it was found that the fracture did not extend along the original boundaries of the particles but transversely through the particles. The texture obtained by working in accordance with this invention is so uniform that its micrograph could hardly be distinguished from that of conventional ingot steel even by a technologist. Whilst the properties of the old welding steel were for the most part dependent upon direction, because the longitudinal material to be welded was laid in the direction of rolling, this is not applicable according to the present invention. When the particles are selected small, that is, with a diameter of less than 2 mm. the welding steel produced does not show, even subsequently, any pronounced texture, presumably because the particles have undergone only a relatively trifling deformation. The steel produced according to this invention has therefore proved satisfactory in the cupping test. In particular, hardly any formation of lobes or peaks occurs. The method is therefore particularly suitable for the production of transformer laminations.

In the usual production of welding steel by rolling, only great thicknesses of material have been obtained in the first pass. With the use of small particles according to the present invention, small thicknesses admit of being obtained even in the first pass. Consequently, it is possible, according to the invention, to produce finished products with a single roll pass. It is therefore possible, with a single roll stand, to produce finished products successfully from the initial material without keeping the total deformation less than is necessary for obtaining a good quality. In a single pass, from granules of a diameter of less than about 2 mm. strips of a thickness of 1.3 mm. have been successfully produced, and this in such a way that no additional deformation was necessary. By employing relatively thin rolls, and smaller particles, still smaller thicknesses of steel strip are obtainable in one pass.

If the particles are kept small, in the sense indicated above, the fagoting or piling of the initial material that is otherwise necessary in welding is omitted. If however, larger particles are employed according to the invention, it may happen that not enough particles are simultaneously engaged by the rolls. In order to remedy this defect, either the particles are bunched, and, it may be, impelled into the roll gap under pressure, or else rolls are used which are of such large diameters that sufficient particles are engaged at the same time. By the aid of the method according to this invention a continuous method of working can be obtained right from the heating kiln to the reel or the cooling bed. The idea is indeed obvious, in this continuous method of working, also to include the production of ball-like particles, so that a continuous working line seems possible from the smelting furnace, through the apparatus for the production of the particles, right to the reel or the cooling bed.

The aim of the further development of the invention is to enable the production of weld steel to be carried out continuously in a practically endless form, of strips or sections for example, in as simple and cheap a manner as possible, but also reliably.

This further development of the invention consists in the combination of a bright-annealing apparatus, inclusive of delivering means, for the members to be welded, for instance steel granulate, with a rolling mill connected to the end of the delivery device, and with a casing protecting the path from the bright-annealing apparatus to the rolling mill from any access of air.

One advantageous construction according to the invention consists in the feature that the bright-annealing apparatus consists of a substantially closed conveyor track for steel granulate, and an indirect heating appliance enclosing the latter, de-oxidising protective gas, for instance hydrogen, being passed in counter-current over the granulate within the conveyor track. In this case the conveyor track is preferably constructed as a rotatable conveying drum.

In a preferred form of construction the task of heating the particles is also assigned to the protective gas. For this purpose the bright-annealing apparatus consists of a rotary cylindrical kiln, with a burner, operated with a restricted supply of air, for heating gas. The partially burnt gas is introduced, in opposition to the direction of delivery of the goods to be welded, the kiln outlet being located in the region of maximum reducing action, which is substantially conditioned by the excess of de-oxidising gases and their temperature. By heating gas is to be understood for example town gas or natural gas. As "parts to be welded," granulates, or even needles or powder, specially produced for this purpose, are preferably employed.

Difficulties are presented in preventing re-oxidation of the particles in the roll gap, even when they are supplied to the roll gap under protective gas. In order as far as possible to prevent re-oxidation of the particles in the roll gap of the rolling mill, in a further development of the invention, the protective gas in the region of the roll gap is supplied from an external source in such a way that in the region of the metal particles at the roll gap a mist of protective gas enveloping the metal particles is formed. The apparatus for carrying out this method consists in a further development of the invention, in that the container, constructed in a known manner as a hopper, for supplying the metal particles to the roll gap, is surrounded by a chamber filled with protective gas, which is opened in the neighborhood of the rolls for the escape of the protective gas. In this way, in a simple manner, the requisite mist of protective gas in the roll-gap region of the rolls is ensured. The oxygen of the air could accordingly only reach the metal particles if it has previously passed through this surrounding mist of protective gas. Since however the mist of protective gas is preferably at a pressure higher than that of the surrounding atmosphere, and is flowing away at the boundary surfaces to the rolls in an outward direction, any excess of oxygen of the external atmosphere is only possible in the immediate neighbourhood of the gap in the outer boundary walls of the chamber filled with protective gas. The out-flowing protective gas, if it is combustible, is burnt. Any penetration right to the inner region of the supply device for the metal particles is accordingly practically precluded.

The boundary walls, extending transversely to the roll axes, of the chamber containing protective gas, may advantageously be adapted to the radii of the rolls and may be advanced right into the neighbourhood of the actual roll gap.

As a protective gas for the chamber, hydrogen, nitrogen or some other non-oxidizing gas or mixture of gases may be employed. In order that even on the delivery side of the rolls no atmospheric oxygen may be able to penetrate into the roll gap and reach the metal particles that are perhaps not yet completely welded, in a further development of the invention a further chamber is provided on this side, which is subject to protective gas.

Two constructional examples of the invention are illustrated in the accompanying drawings, in which:

FIGURES 2 and 2a show apparatus in which the protective gas consisting for instance of partially burnt town gas, also serves for heating the granulate;

FIGURE 5 shows a view looking in the direction of the roll axes of the apparatus for supplying the parts to be welded into the roll gap of a rolling mill;

FIGURE 6 shows a view partly in section on the line VI—VI looking in the direction of the arrow A in FIGURE 5; and FIGURE 7 shows a plan of the rolling mill of FIGURES 5 and 6.

Figure 1:
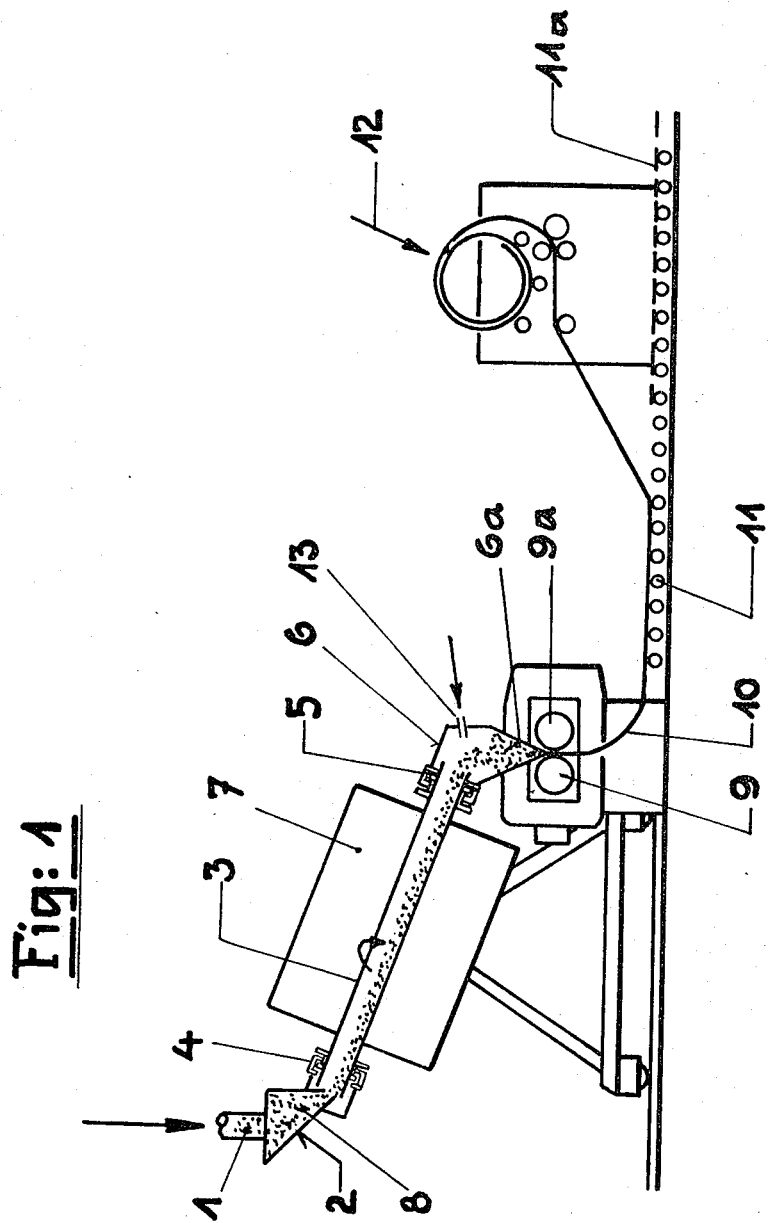
FIGURE 1 shows apparatus with a kiln or oven which is indirectly heated electrically and in which the protective gas may be assumed to consist for instance of hydrogen gas.

According to FIGURE 1, the granulate, through a tube 1, is filled into a hopper 2, which opens into a rotatable tube 3, which is journalled and sealed at rotary passageways 4 and 5. The other end of the tube 3 opens by way of the rotary passageway 5 into an intermediate container 6, with an associated hopper 6a. The rotatable tube 3 is surrounded by an electrical heating appliance 7. The lower end of the hopper 2 is so dimensioned that a substantially uniform flow, limited as regards quantity, of granulate 8, passes through the tube 3. Usual dosing appliances, vibratory conveyors or strip-weighing means may also be provided, in order to obtain a uniform flow of the granulate. The granulate, heated and reduced in the tube 3, flows into the container 6, the connection of which with the tube 3 is sealed against external air. The container 6, by its hopper 6a, opens immediately above the roll gap, which is formed by two rolls 9 and 9a. The hopper is so shaped that as little gas as possible, which is admitted at a raised pressure into the hopper 6a, can escape from the interstices between the hopper 6a and the rolls 9 and 9a. The rolls 9 and 9a may be driven in the usual manner. A rolled strip 10 produced by them is bent round and guided onto a roller bed 11, upon which it can run either straight on as a strip 11a, or from which it is transferred to a winding means 12. The latter is to be preferred when it is a question of a flat strip; but the arrangement of the strip 11a is preferable when it is a question of profile strips.

At 13, protective gas is introduced into the hopper 6a, this being a gas which has a de-oxidising action, and which consequently withdraws oxygen from the heated granulate. It is preferable to employ hydrogen gas. Inside the space enclosed by the members 3 and 6 a raised pressure is formed, so that air cannot enter the spaces 3 and 6 from any point. Where no complete sealing can be effected, for instance in the region of the roll gap or at the mouth of the hopper 8 where it discharges into the tube 3, some hydrogen still escapes, owing to the raised pressure, but this can burn harmlessly in the atmosphere.

The hopper 8 is always kept so full as to form a pressure brake, which secures the desired raised pressure in the tube 3. From the aperture 1, excess protective gas escapes, and can be burnt from there or from a special burner, or supplied for some other utilisation.

In order that in the roll gap any re-oxidation of the granulate may be substantially prevented, the hopper for supplying the granulate to the roll gap may advantageously be of the construction shown in FIGURES 5, 6 and 7.

In these figures, 90 denotes the rolls, in the roll gap 91 of which metal particles or granules 92 are welded into a section 93, in the present case a strip. The granules 92 are supplied to the roll gap 91 by a feeding device 60, constructed as a hopper, which consists of two lateral boundary walls 61 and 62, and two boundary walls 63 and 64 extending parallel to the roll axes 94. The lateral boundary walls 61 and 62 are shaped to fit the peripheries of the rolls 90. The boundary walls 63 and 64 extend right to the roll surfaces 95. The feeding device 60 is enclosed in or surrounded by a chamber 65 filled with a protective gas. The protective gas flows through pipes 66 and 67 to the chamber 65, which consists, like the feeding devices 60, of two lateral boundary walls 68 and 69, and two boundary walls 70 and 71 extending parallel to the roll axes 94. The lateral boundary walls 68 and 69 are likewise adapted to the peripheries of the rolls 90, and extend approximately to the roll gap 91. The chamber is closed above by a top wall or cover 72, whereas in the region of the rolls it is open for the escape of the protective gas. On the under side of the rolls a further chamber 73 is provided, which is likewise filled with protective gas through supply pipes 74, so that the finished rolled product that issues, in the present case the strip 93, is guided through this atmosphere of protective gas. This reliably prevents atmospheric oxygen passing from this side of the rolls through the roll gap to the granules 92 that have not yet been treated.

Figure 2:
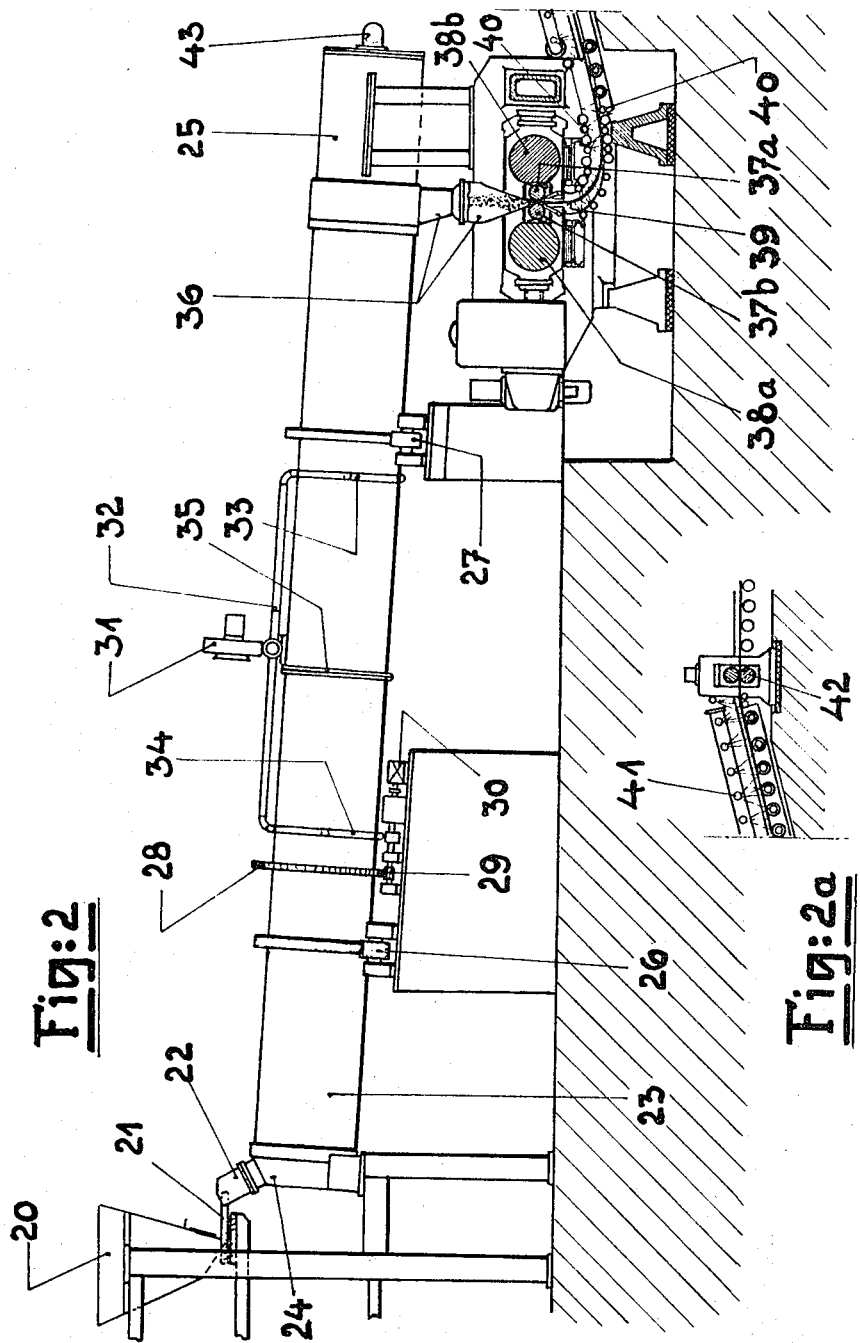

In the constructional example of FIGURE 2, the granulate is thrown into a hopper 20, from which it flows to a dosing appliance 21, out of which it passes into a tubular nozzle 22 of a rotary cylindrical kiln or oven 23, 24, and 25. The parts 24 and 25 of the rotary cylindrical kiln are non-rotatable, and are sealed in relation to the rotatable part 23. The part 23 is supported upon rollers 26 and 27, and carries a toothed rim 28, which, by way of a pinion 29, is driven by an electric motor 30.

Upon the rotatable part 23 of the rotary cylindrical kiln is mounted a fan 31, which may be electrically driven, and which draws in air from the surrounding atmosphere by suction and impels it by way of pipes 32 and ring pipes 33 and 34 into the part 23. The electric motor that drives the fan 31 receives its current from an annular contact bar 35.

On the non-rotatable part 25 of the rotary cylindrical kiln is mounted an outlet funnel 36, which supplies the heated garnulate to the working rolls 37a, 37b of a rolling mill. These working rolls are supported by backing rolls 38a and 38b. The strip 39 formed in the gap between the rolls 37a and 37b is cooled by sprinklers 40 and 41, and is at the same time bent round. For this purpose the rollers of a roller bed are arranged between the sprinklers 40. The strip then runs to a driving appliance 42, beyond which a further cooling means may be arranged. There may then follow the usual devices, such as shears, winding machines and the like.

Into the part 25 of the kiln there opens at 43 an air pipe and a gas pipe, which force coal gas and air at an appropriately raised pressure into burners, which are arranged in the part 25. This partly burnt town gas passes to the left from the part 25 on to steel granulate which is already preheated, heats it further, and thoroughly deoxidizes it. The gas, in consequence of its pressure, passes on further to the left, and is mixed, in the region 33, with air from the pipe 32 and from the annular pipe 33, so that it continues to burn in the region of the rotatable part 23, located further to the left. In order to obtain complete combustion, with excess of air, air is once more supplied by way of the annular pipe 34. The products of combustion of the now almost completely burnt town gas pass out at 22, and may be conveyed from there to a chimney, a heat-exchanger or the like. The granulate travelling in from the left is therefore highly heated, but undergoes at first a further oxidation. The heating increases in the space between the annular pipes 34 and 33, and according to the adjustment of the air and gas supply some further oxidation may occur, or else a certain deoxidation. In the space between the members 33 and 36 a further heating and fundamental de-oxidation of the granulate occurs, and this granulate, protected from access of air, by the casing and the hopper 36, is then supplied to the roll gap between the rolls 37a and 37b.

It is preferable to use a granulate the particles of which have on an average a diameter of about 1 to 2 mm. Such granulate can be rolled substantially more quickly than powder, so that the rolls 37a and 37b and the rolls 9 and 9a revolve at a peripheral speed of more than 1 metre per second, preferably from 1 to 1.5 metres per second. At such speeds, powder would come whirling out of the rolling mill. The rolling speed may be kept much higher than in installations which cold-roll so-called "green strip" and then supply it to an annealing furnace (sintering furnace), since such sintering furnaces, at a rolling speed according to this invention, would have to be of practically intolerable length.

Since a raised pressure prevails in the rotary cylindrical kiln, protective gas also passes into the hopper 36, and protects the granulate against oxidation until it enters the roll gap.

Obviously it is also possible to employ roll stands the roll axes of which do not lie in a horizontal plane, but in a vertical plane for example. Means for supplying the granulate to such rolling mills are known. As hereinbefore mentioned, welding mechanisms other than rolling mills, may be employed, such as a worn press for example, or the aforementioned compression machine.

Figure 3:
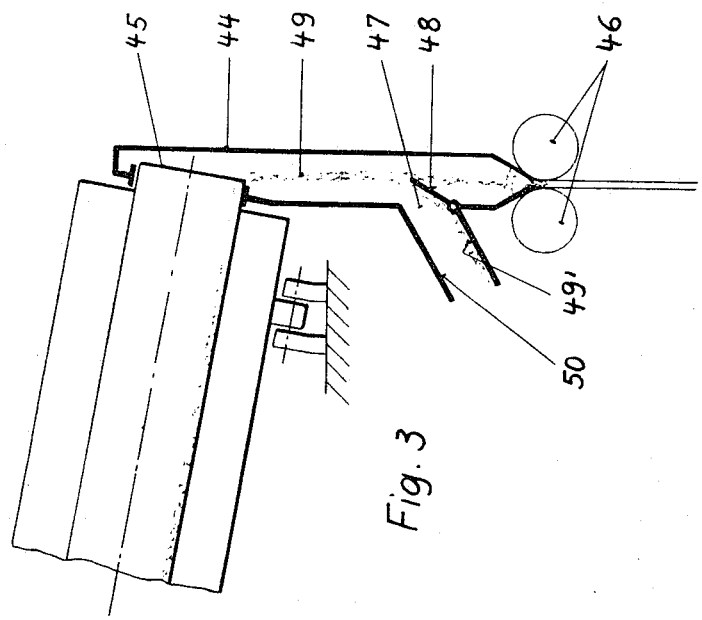
FIGURE 3 shows the kiln outlet, and the rolling mill arranged thereunder.
Figure 4:
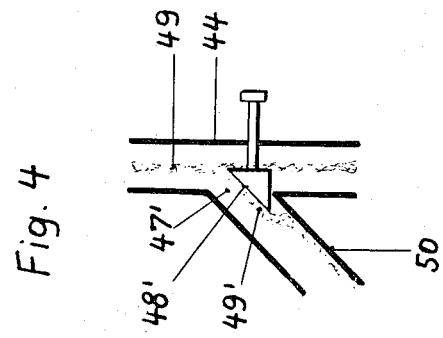
FIGURE 4 shows a partial section of FIGURE 3.

In order to obviate an adjusting of the rolls under pressure, and to enable the kiln to be operated undisturbed during a brief interruption in the operation of the rolling mill, for the maintenance of constant temperature and passage conditions of the granulate, thus keeping it always ready for operation, in a further development of the invention, in the intermediate container 44 of FIGURE 3, which is arranged between the rotatable tube 45 and the pair of rolls 46, a lateral aperture 47 is provided, which co-operates with a flap valve 48 or a wedge 48' (FIGURE 4) in such a way that during the rocking of the flap valve 48 or the pushing of the wedge 48' into the flow of particles 49, these particles emerge wholly or partly from the lateral by-pass aperture 47 (FIGURE 3) or 47' (FIGURE 4) of the intermediate container 44. The out-flowing current of particles 49' is then discharged, out of reach of the rolling mill, by way of the by-pass 50.

A further advantage of the by-pass resides in the fact that in the event of a relatively long disturbance of the rolling mill the kiln can be emptied without the stock having to be passed through the rolls. Repairs can then be carried out immediately on the rolling mill without hindrance.

We claim:
1. A method for the production of steel strip, comprising
   (a) providing steel particles which have a mesh size of at least 0.2 mm. and are at a temperature of about 600° to 950° C.; and
   (b) rolling the heated particles in a rolling mill with a peripheral roll speed greater than about 0.4 meter per second to provide a substantially fully densified steel strip in one roll pass.

2. A method for the production of strip steel as claimed in claim 1, wherein no dimension of the particles is greater than eight times the thickness of the material of the strip produced.

3. A method as claimed in claim 1, wherein said particles are similar to one another in size and in shape.

4. A method as claimed in claim 1, wherein said particles consist of iron sponge.

5. A method as claimed in claim 1, wherein said particles have a maximum particle dimension of more than 0.5 mm., and are rolled with a peripheral speed of the rolls of from 1 to 1.5 metres per second.

6. A method as claimed in claim 1, wherein the heating of said particles, at least within the temperature range above 600° C., is effected in a reducing atmosphere in the manner of bright annealing, whereupon a further heating of the said parts is effected, up to the rolling temperature, with protection against renewed oxidation.

7. A method as claimed in claim 6, wherein said particles, as soon as and as long as they are heated up to at least about 500° C., are moved relatively to one another, in order to obviate caking together.

8. A method as claimed in claim 6, wherein the reduction of the surface oxides is effected by means of gaseous reducing agents generated from solid carbonaceous materials.

9. A method as claimed in claim 6, wherein the deoxidation and heating is effected by partial combustion of town gas in a passage which furnishes, at least in the region preceding the discharge of said particles, reducing conditions, to which said particles remains exposed by suitable dimensioning of the transit time right up to complete deoxidation.

10. A method as claimed in claim 6, wherein the heating of the said particles is effected by indirect heating, and the reduction by hydrogen.

11. A method as claimed in claim 1, wherein the heating of said particles is effected in a rotary cylindrical kiln.

12. A method as claimed in claim 11, wherein the heating of said particles is effected in a rotary cylindrical kiln, under reducing conditions, by direct gas heating.

13. A method for the production of steel strip, comprising
(a) providing steel particles which have a mesh size of at least 0.2 mm. and are at a temperature of about 600° to 950° C.; and
(b) rolling the heated particles in a rolling mill with a peripheral roll speed greater than about 0.4 meter per second while protecting the particles from oxidation, to provide a substantially fully densified steel strip in one roll pass.

14. A method as claimed in claim 13 wherein the particles are rolled with the rolls in direct contact with the particles.

15. A method as claimed in claim 13 wherein the distance travelled by the periphery of each roll per second is at least 2,000 times the mesh size of the particles.

16. A method as claimed in claim 13 wherein the particles are formed by granulating molten steel.

17. A method as claimed in claim 13 wherein the steel particles supplied to the rolling mill rolls are free of adhering surface contaminations.

18. A method as claimed in claim 13 and including the steps of treating the particles with a reducing agent to remove surface oxide and protecting the particles from re-oxidation up to the rolling step.

References Cited

UNITED STATES PATENTS

| | | | |
|---|---|---|---|
| 2,263,520 | 11/1941 | Eindhoven | 75—226 X |
| 2,290,734 | 7/1942 | Brassert. | |
| 2,646,456 | 7/1953 | Jacquier | 75—222 X |
| 2,708,770 | 5/1955 | Herres | 75—214 X |
| 3,119,690 | 1/1964 | Wagner | 75—226 |
| 3,122,434 | 2/1964 | Reed | 75—214 |

FOREIGN PATENTS

| | | |
|---|---|---|
| 700,658 | 12/1953 | Great Britain. |
| 783,138 | 9/1957 | Great Britain. |

CARL D. QUARFORTH, *Primary Examiner.*

BENJAMIN R. PADGETT, *Examiner.*

A. J. STEINER, *Assistant Examiner.*